UNITED STATES PATENT OFFICE.

MORITZ BLUMENTHAL, OF GRUNAU, NEAR BERLIN, GERMANY.

MANUFACTURE OF PURE NON-ORGANIZED FERMENTS.

SPECIFICATION forming part of Letters Patent No. 338,471, dated March 23, 1886.

Application filed June 11, 1885. Serial No. 168,399. (Specimens.) Patented in Belgium May 4, 1885, No. 68,754; in France May 4, 1885, No. 168,675; in England May 4, 1885, No. 5,483; in Sweden May 4, 1885, No. 220; in Germany May 5, 1885, No. 34,043; in Luxemburg May 5, 1885, No. 527; in Canada July 9, 1885, No. 22,047, and in Spain September 2, 1885, No. 5,040.

*To all whom it may concern:*

Be it known that I, MORITZ BLUMENTHAL, (doctor of philosophy,) a subject of the King of Prussia, residing at Grunau, near Berlin, Prussia, German Empire, have invented certain new and useful Improvements in the Manufacture of Pure Non-Organized Ferments; and I do hereby declare the following to be a full, clear, and exact description of the invention, such as will enable others skilled in the art to which it appertains to make and use the same.

In organic chemistry that class of products which I may term "zymotic products" are now known under the generic title of "enzymæ"— a word derived from the Greek $\varepsilon \nu$, "in," and $\zeta \upsilon \mu o \upsilon \nu$, "ferment" or "inner ferment," if I may so call it, to which products belong pepsin or gasterase and pancreatine— the active agents of digestion that produce the necessary reactions in the food and result in what is called "digestion." One of these active principles or agents of digestion has been known under various names—namely, "pepsin," also called "gasterase" and "chymosin." I have found, however, that pepsin and chymosin are two different agents having unlike properties. For instance, pepsin when employed in the manufacture of cheese to curdle milk has no effect upon the milk, while the chymosin is the effective agent that reacts upon the milk and causes it to curdle.

Pepsin as well as pancreatine have been for some time extensively used for medicinal purposes; but before my invention neither of these zymotic products have been obtained in an absolutely pure state. Not only is what is known in commerce as "pepsin" a compound of pepsin and chymosin, or extract of rennet, or rennet, but these as well as the pancreatine now found in commerce contain both in large proportions impurities that will cause their solutions to rapidly decompose. These impurities consist, chiefly, in mucous, albuminous, and other impurities that impart to these products an offensive smell and taste and render them valueless for many purposes.

This invention relates therefore to and has for its object the production of these zymotic agents or products in a pure form—that is to say, pepsin uncombined with chymosin and pepsin, chymosin, and pancreatine free from any foreign substances or constituents. These pure products are nearly odorless and tasteless. They are perfectly soluble in water, and form tasteless and odorless and clear or limpid solutions that do not readily decompose. They may be preserved for a long time either in a fluid or dry state without deterioration and under varying climatic influences without impairing their properties. Even at temperatures as high as 35° centigrade they may be kept in good condition for a long time. If desired, a neutral preservative—such as an alkali soluble in water—may be mixed therewith, or sugar, as will hereinafter appear.

The process of obtaining a zymotic product, for instance, from the stomach of swine, as heretofore carried out, is based upon the fact that such product can be precipitated by means of alcohol or by means of an acid. Schäffer also proposed to obtain pepsin from saline solutions thereof. In either process a very large proportion of mucous and albuminous matter is precipitated with the zymotic product, and in the case of pepsin it is obtained in combination with chymosin, while the process proposed by Schäffer has the further disadvantage of too great a loss of pepsin-chymosin resulting from the impossibility of obtaining all these products from its saline solutions, and for this reason is impracticable for commercial purposes, owing to the high price of the impure product obtained.

In view of the above I do not herein claim the process of obtaining zymotic products by precipitation either by means of alcohol or by means of an acid only, or by means of a saline solution *per se*, as by these processes a pure zymotic product cannot be obtained, nor can a separation of the pepsin from the chymosin be effected.

The invention consists in a novel process for obtaining these products in the pure form mentioned, as hereinafter fully described; and I desire it to be understood that I do not herein lay claim to the products as articles of commerce or manufacture, as I have claimed the same in a separate application for Letters Patent of the United States of even date, with Serial No. 168,400.

I have found that chymosin, the active agent in milk, may be obtained from rennet or the stomachs of ruminants, and more especially that of the calf, which contains comparatively little pepsin, the chymosin preponderating. In the stomach of the pig or sheep, on the other hand, I have found that pepsin preponderates; hence if the chief product is to be chymosin it will be found of advantage to employ the stomach or rennet of the calf as a raw material, and if pepsin is to be the chief product it will be of greater advantage to employ the stomach or rennet of the pig or sheep.

Inasmuch as the treatment of the material is the same whether pepsin, chymosin, or pancreatine is to be obtained, and inasmuch as the latter is never allied with the former, I will first describe the mode of carrying out my invention in the production of pepsin and chymosin and their separation from each other, taking as raw material the stomach or rennet of the calf. This is cut into small pieces and macerated or digested for about twenty-four hours in a solution preferably of common cooking-salt containing about five per cent. of salt kept at a temperature of 30° centigrade, more or less. The solution is then filtered, and a small amount of a mineral acid mixed therewith—such as hydrochloric, or sulphuric, or phosphoric acid—in the proportion of about 0.1 per cent. The reaction of the acid on the saline solution gives rise to a thick precipitate of mucous matter, which contains but traces of chymosin and no pepsin, the solution during the acidulation being preferably kept at a temperature of about 20° to 30° centigrade, as at such temperature the mucous matter agglomerates more rapidly or readily, and may in this condition be easily separated from the solution, which is effected only with the greatest difficulty otherwise. The filtered solution is again acidulated to the extent of about 0.5 per cent. of acid, and pulverized cooking-salt is added until a precipitate of the latter is formed. This supersaturated acidulated salt solution is now brought to a temperature of 25° to 30° centigrade, and kept at this temperature for two or three days under constant agitation, and then allowed to rest for a day or so, the temperature being increased to 30° or 35° centigrade. A separation then takes place in the form of a white flocculent substance, which floats on or in the solution, and may be readily collected on a filter, removed, washed in a solution of cooking-salt, and then dried at a temperature of about 28° centigrade. The substance separated from the solution is the pure zymotic product called "chymosin." It is an amorphous white gelatinous substance, greatly resembling hydrate of alumina, is without taste or smell, and soluble in water, forming a limpid or clear solution. It may be kept for years without deterioration, and is not injured by temperatures reaching as high as 35° centigrade. The remaining salt supersaturated acid-liquor or mother-lye free from chymosin does not cause milk to curdle when mixed therewith, the active agent, chymosin, which alone produces this reaction in milk, having been eliminated. The pepsin held in solution in the mother liquor or lye may now be separated therefrom by neutralizing the solution with an alkali and agitating the same for some time, the pepsin being obtained as a gelatinous precipitate insoluble in the concentrated neutral salt solution but soluble in the acid salt solution. Pure pepsin may also be obtained from the so-called "impure" pepsin essences or extracts of rennet of commerce by acidulating these extracts or the solutions of the dry rennet with one of the mineral acids above referred to in the proportion of about 0.2 per cent. of the acid, whereby the impurities are precipitated. These are removed by filtration, an excess of cooking-salt added, as described, to separate the chymosin which is collected, and the remaining solution is neutralized to precipitate therefrom the pepsin. In this case, also, chymosin and pepsin are separately obtained free from any albuminous or mucous and other impurities. In precisely a similar manner pancreatine may be obtained from the acidulated fluid extracts of the pancreatic glands. These glands are comminuted and macerated or digested for about twenty-four hours, preferably in a solution of common cooking-salt containing about five per cent. of salt kept at a temperature of 30° centigrade, more or less. The solution is then filtered, and a mineral acid in the proportion of about 0.1 per cent. added to precipitate the mucous and albuminous matter, the solution being kept during this acidulation at a temperature of 20° or 30° centigrade for reasons previously stated. The precipitate is removed and the solution is further acidulated to the extent of about 0.5 per cent. of acid and cooking-salt added until a precipitate of the latter is formed. The supersaturated acidulated salt solution is now brought to a temperature of about 25° or 30° centigrade, and kept at this temperature for about two or three days under constant agitation, and is then allowed to rest under an increased temperature of 30° or 35° centigrade, as stated hereinbefore, when the pure pancreatine will separate from the solution, and may be obtained by filtration, or otherwise, and is finally washed in a solution of cooking-salt, and then dried.

Instead of cooking-salt, other soluble alkali salts may be employed in the process, especially the sulphates and the chlorides, as well as the chlorides of alkaline earths.

These enzymæ or zymotic products are dried at a temperature of 35° centigrade, more or less, and may then be used as commercial articles, or they may be placed upon the market in a fluid form, and, if desired, a neutral preserving agent readily soluble in water may be mixed therewith—such, for instance, as ordinary cooking-salt or sugar. This preserving agent is incorporated with the product by rubbing the two together, or otherwise manipulating the same, to effect an intimate combination before said products are dried or dissolved, as the case may be.

Having described my invention, what I claim, and desire to secure by Letters Patent, is—

1. The hereindescribed process of obtaining enzymæ or zymotic agents in a pure form, which consists in acidulating a saline solution in which said agents are held in solution with mucous and albuminous matter to separate the latter from the zymotic agent, removing such mucous and albuminous matter, and supersaturating the solution with a salt of the alkalies or alkaline earths to separate the zymotic agent from the solution, substantially as described.

2. The described process of obtaining pure enzymæ or zymotic agents or products, such as chymosin and pepsin, which consists in separating and precipitating the impurities and keeping the pepsin in solution by acidulating a solution containing such products or agents, removing the precipitate, supersaturating the solution with a salt of the alkalies or alkaline earths to effect the separation of the chymosin, removing the latter, and neutralizing the solution with an alkali to precipitate the pepsin, as described.

In testimony whereof I affix my signature in presence of two witnesses.

MORITZ BLUMENTHAL.

Witnesses:
A. DEMELIUS,
B. ROI.